(12) United States Patent
Chu

(10) Patent No.: US 12,483,015 B2
(45) Date of Patent: Nov. 25, 2025

(54) CONNECTION BOX

(71) Applicant: Zooey C Chu, Caledonia, MI (US)

(72) Inventor: Zooey C Chu, Caledonia, MI (US)

(*) Notice: Subject to any disclaimer, the term of this patent is extended or adjusted under 35 U.S.C. 154(b) by 189 days.

(21) Appl. No.: 18/503,863

(22) Filed: Nov. 7, 2023

(65) Prior Publication Data

US 2024/0405532 A1 Dec. 5, 2024

(30) Foreign Application Priority Data

May 29, 2023 (CN) .......................... 202321317235.4

(51) Int. Cl.
*H02G 3/08* (2006.01)

(52) U.S. Cl.
CPC .................... *H02G 3/081* (2013.01)

(58) Field of Classification Search
CPC .......... H02G 3/08; H02G 3/081; H02G 3/088; H02G 3/10; H02G 3/185; H02G 3/12; H01R 13/52; H01R 13/46; H05K 5/00; H05K 5/02; H05K 5/0217; H05K 5/0247; H05K 5/03
USPC ....... 174/50, 53, 57, 58, 480, 481, 535, 520, 174/482, 483, 484, 486, 490, 502, 66, 67; 220/3.2–3.9, 4.02; 248/906
See application file for complete search history.

(56) References Cited

U.S. PATENT DOCUMENTS

| | | | |
|---|---|---|---|
| 4,810,833 A | 3/1989 | Meyers | |
| 4,968,856 A * | 11/1990 | Bowley | H01R 13/447 174/67 |
| 5,078,614 A * | 1/1992 | Shotey | H01R 13/447 174/67 |
| 5,932,845 A | 8/1999 | Lacy | |
| 7,485,804 B2 * | 2/2009 | Dinh | H02G 3/123 174/64 |
| 7,579,549 B2 * | 8/2009 | Jolly | H02G 3/14 174/67 |
| 7,674,975 B2 * | 3/2010 | Atkinson | H01R 13/447 174/67 |
| 8,399,765 B1 * | 3/2013 | Baldwin | H02G 3/14 174/67 |
| 8,519,276 B2 * | 8/2013 | Isaacks | H02G 3/185 70/387 |
| 8,563,859 B1 * | 10/2013 | Baldwin | H02G 3/14 174/67 |
| 10,084,299 B1 | 9/2018 | Huang | |
| 10,276,319 B1 * | 4/2019 | Birdsong | H02G 3/14 |
| 10,772,223 B2 * | 9/2020 | Pedoeem | H05K 5/0217 |
| 11,233,382 B2 * | 1/2022 | Oliver | H01R 13/447 |

* cited by examiner

*Primary Examiner* — Angel R Estrada
(74) *Attorney, Agent, or Firm* — Best & Flanagan LLP

(57) ABSTRACT

A connection box comprises a box body and a plug-in panel disposed on a top portion of the box body. The box body includes a guiding groove therein. The guiding groove extends from the top portion of the box body into an interior of the box body. A shielding member is slidably received in the guiding groove. The guiding groove and the shielding member in the box body permit the plug-in panel to be reliably covered, thereby avoiding dusts or any liquid from entering the plug-in hole and causing short circuit. The guiding groove has several sections, such that the shielding member can be suitably received in the box body, thereby reducing the overall volume of the box body, reducing the amount of material of the box body, and increasing the aesthetics of the overall connection box.

6 Claims, 6 Drawing Sheets

CONNECTION BOX

BACKGROUND OF THE INVENTION

The present invention relates to the field of electrical appliance elements and, more particularly, to a connection box.

A connection box is an electrical connection device which can be inserted into a top face of a desk for connection with electronic devices, electrical appliances, etc. The connection box includes a plug-in panel with plug-in holes. When not in use, dusts or water might fall into the plug-in holes, resulting in short circuit and damaging the plug-in panel. Furthermore, the exposed plug-in panel may render the top face of the desk uneven and, thus, unaesthetic, thereby adversely affecting the overall aesthetics of the desk.

BRIEF SUMMARY OF THE INVENTION

An objective of the present invention is to provide a connection box which may solve the problems of the current technology.

To achieve the above objective, the present invention provides the following technical solution.

A connection box according to the present invention comprises a box body and a plug-in panel disposed on a top portion of the box body. The box body includes a guiding groove therein. The guiding groove extends from the top portion of the box body into an interior of the box body. A shielding member is slidably received in the guiding groove.

The box body of the connection box is inserted into a top face of a desk when in use. The plug-in panel is used for supply power to electronic devices, electrical appliances, etc. The shielding member can cover the plug-in panel to avoid dusts or liquids from falling onto the plug-in panel when not in use while increasing the aesthetics of the top face of the desk.

In an example, the guiding groove includes a first section located above the plug-in panel, a second section on an end of the plug-in panel, and a third section below the plug-in panel. The shielding member is slidable along the first section, the second section, and the third section.

By providing a guiding groove having three sections in which the first section is located above the plug-in panel, the plug-in panel can be covered when the shielding member is in the first section. Furthermore, the second section is on an end of the plug-in panel, and the third section is below the plug-in panel. Thus, the overall guiding groove is substantially slanted U-shaped, such that the shielding member can be suitably received in the box body, which is advantageous to reduction in the volume of the box body, reduction in the material of the box body, and increase in the overall aesthetics of the connection box.

In an example, the shielding member is soft.

In an example, the shielding member is comprised of a plurality of sections connected to each other, and each two adjacent sections are rotatable relative to each other.

Since the guiding groove is substantially slanted U-shaped and the shielding member is soft, the shielding member can slide smoothly in the guiding groove. By provision of the shielding member comprised of a plurality of connected sections in which each section can rotate at the interconnecting portion, more smooth sliding movement of the shielding member is provided.

In an example, the shielding member includes a handgrip.

A user can grip the handgrip to smoothly slide the shielding member.

In an example, the box body includes a fixing block including at least one coupling board.

The fixing block is used to insert the box body into the top face of the desk. The least one coupling board is configured to be coupled with at least one opening in the top face of the desk. Thus, the box body is positioned.

In an example, the box body further includes a plurality of recessions, and the fixing block includes a plurality of protrusions engaged with the plurality of recessions to connect the fixing block to the box body.

In an example, the plug-in panel includes a plurality of plug-in holes and is in electrical connection with a wireless charging module.

In comparison with the current technology, the connection box according to the present invention has several advantages. Specifically, the disposition of the guiding groove and the shielding member in the box body permits the plug-in panel to be reliably covered, thereby avoiding dusts or any liquid from entering the plug-in holes and causing short circuit. Furthermore, the guiding groove has several sections, such that the shielding member can be suitably received in the box body, thereby reducing the overall volume of the box body, reducing the amount of material of the box body, and increasing the aesthetics of the overall connection box.

The present invention will become clearer in light of the following detailed description of illustrative embodiments of this invention described in connection with the drawings.

DETAILED DESCRIPTION OF THE INVENTION

Figure 1:
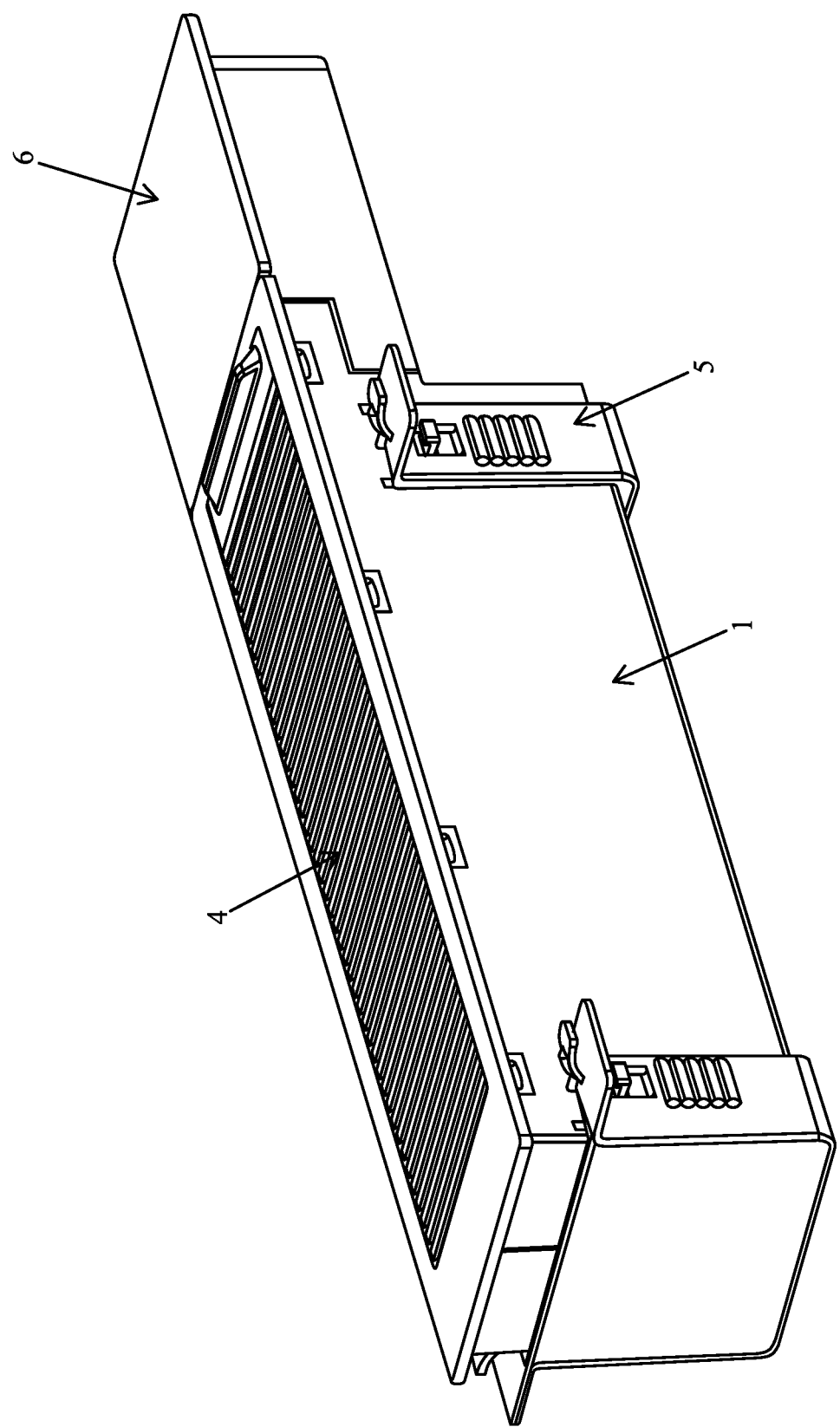
FIG. 1 is a diagrammatic perspective view of a connection box of an embodiment according to the present invention.

The technical solution of the embodiments of a connection box according to the present invention will be clearly and fully described in connection with the accompanying drawings. Nevertheless, it can be appreciated that the described embodiments are merely a portion of the embodiments of the present invention, not all of the embodiments.

When the terms "upper", "lower", "front", "rear", "vertical", "horizontal", and similar terms are used herein, it should be understood that these terms have reference only to the direction or position shown in the drawings to facilitate and simplify the description of the invention. These terms should not be used to indicate or hint that the indicated device or element must have a specific orientation and that the indicated device or element must be constructed and operated according to the specific orientation. Therefore, these terms should not be construed to restrict the invention.

Unless explicitly indicated otherwise, the terms "installation", "connection", "coupling", or similar terms referred to herein should be interpreted broadly, such as fixed connection, separable connection, integral formation, mechanical connection, welding, direct connection, indirect connection via a medium, communication between interiors of two elements, or mutual operating relationship between two elements. The specific meaning of these terms in the invention can be appreciated by one having ordinary skill in the art according to the specific conditions.

Unless explicitly indicated otherwise, when a first feature is "on" a second feature may indicate direct contact between the first and second features or indirect contact between the first and second features via a medium. Furthermore, when a first feature is "above", "over" or "atop" a second feature may indicate that the first feature is directly or obliquely above the second feature or may simply express that the first feature is at a level higher than the second feature. When a first feature is "below", "beneath" or "under" a second feature may indicate that the first feature is directly or obliquely below the second feature or may simply express that the first feature is at a level lower than the second feature.

Figure 2:
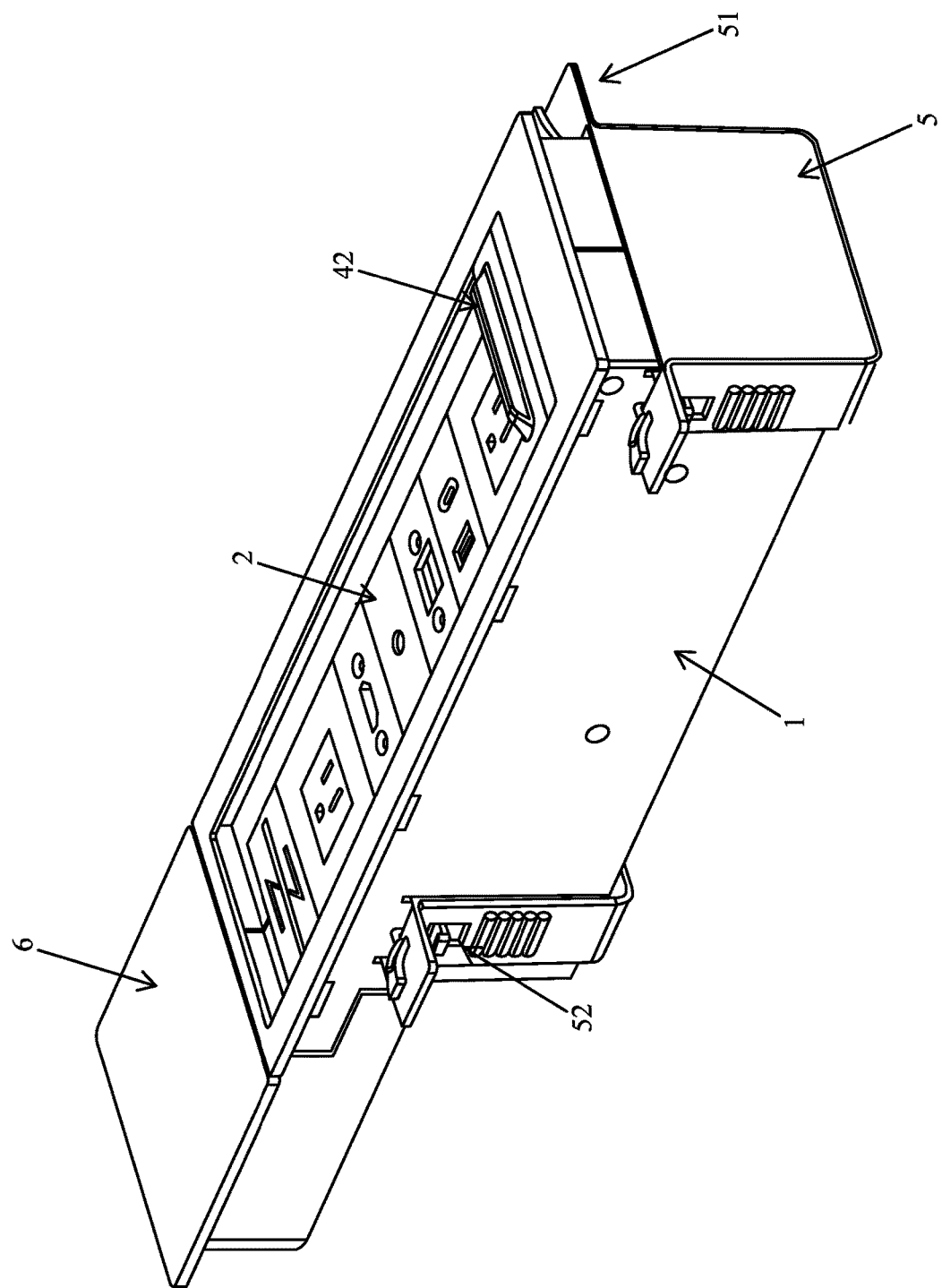
FIG. 2 is another diagrammatic perspective view of the connection box according to the present invention with a plug-in panel of the connection box revealed.
Figure 3:
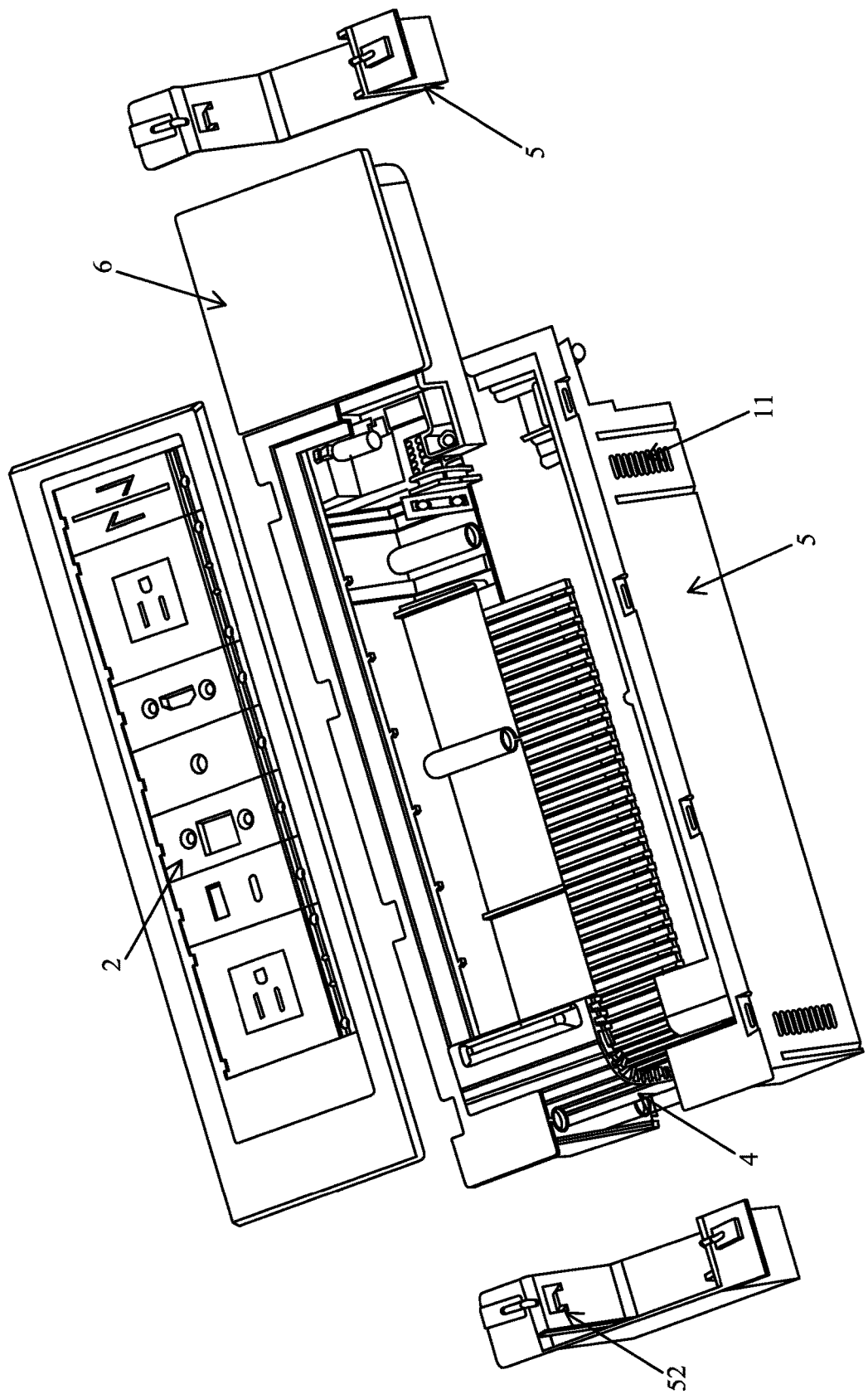
FIG. 3 is a diagrammatic exploded, perspective view of the connection box according to the present invention.
Figure 4:
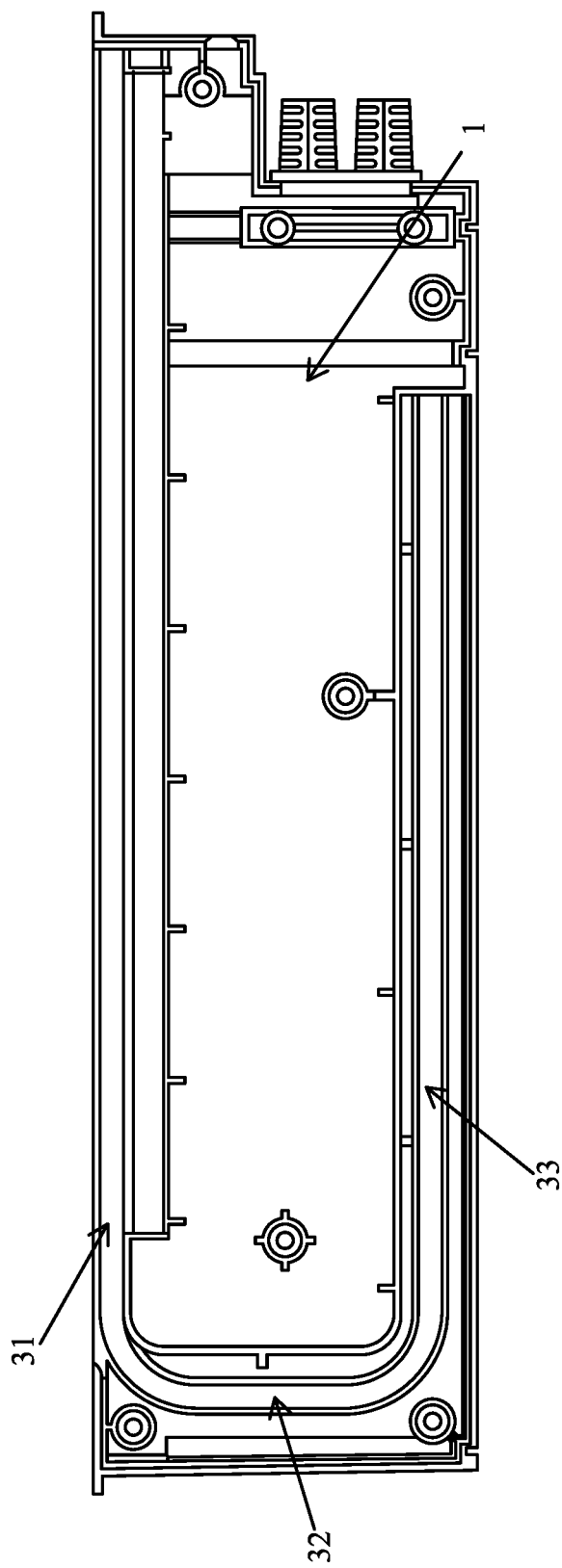
FIG. 4 is a diagrammatic side view illustrating the interior structure of a box body of the connection box according to the present invention.
Figure 5:
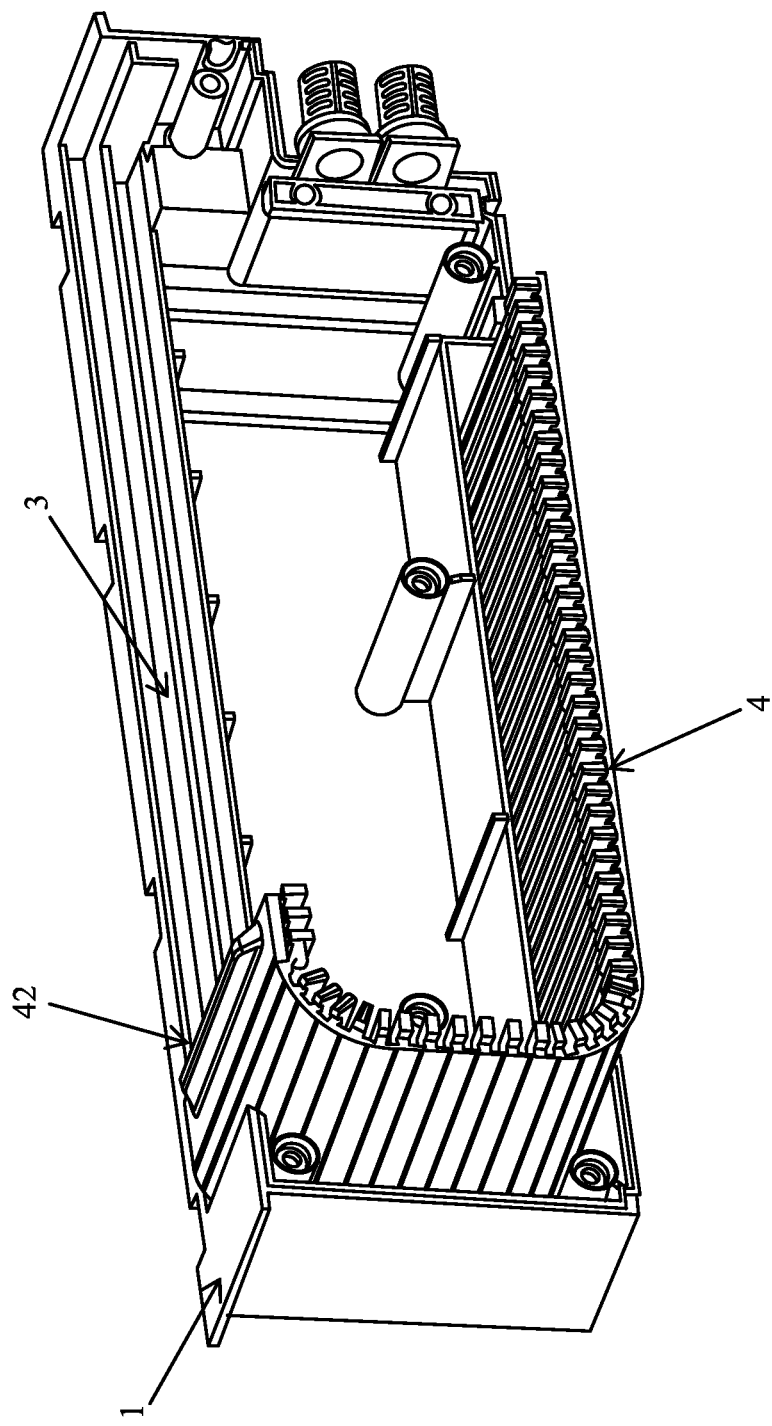
FIG. 5 is a diagrammatic perspective view illustrating disposition of the box body and a shielding member.
Figure 6:
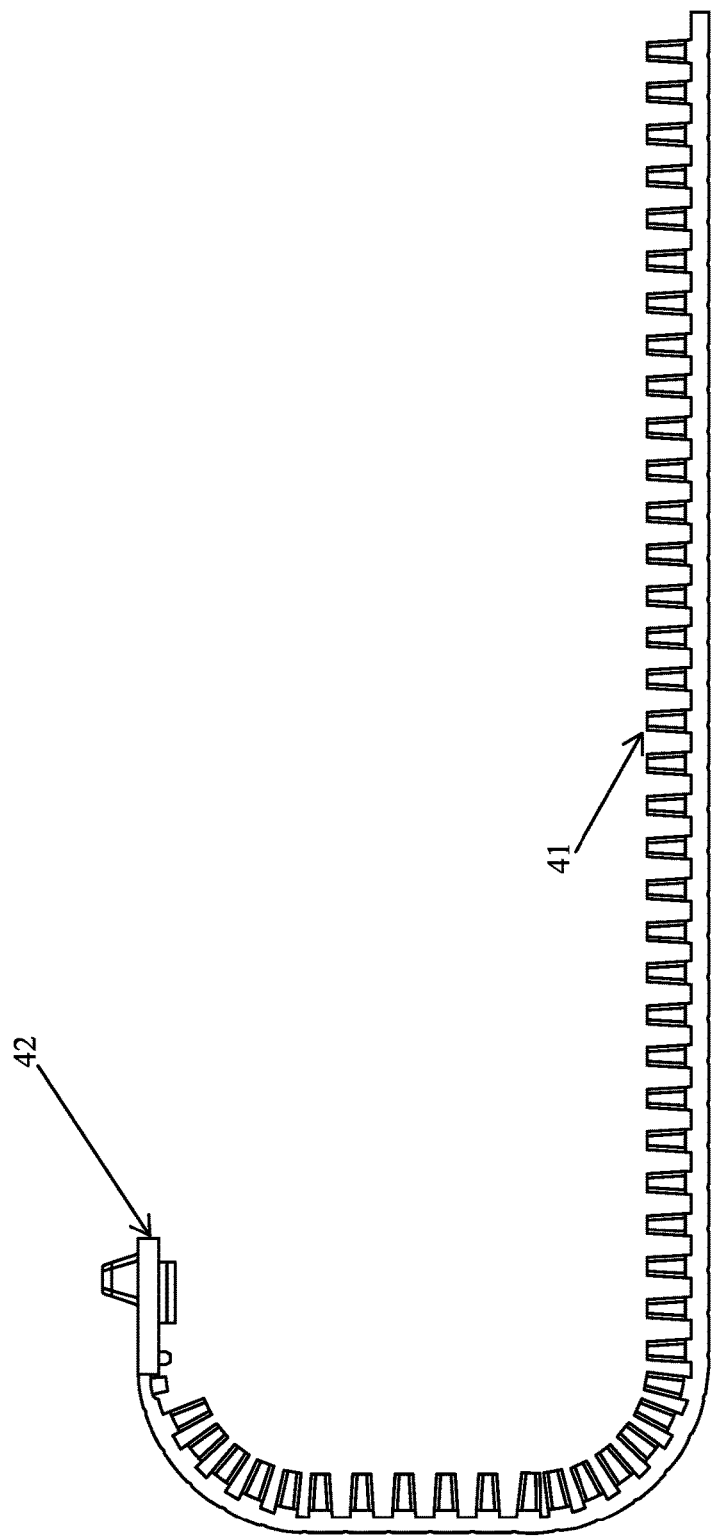
FIG. 6 is a diagrammatic side view of the shielding member of the connection box according to the present invention.

An embodiment of the connection box according to the present invention will be set forth with reference to FIGS. 1-6.

The connection box according to the present invention comprises a box body 1 and a plug-in panel 2 disposed on a top portion of the box body 1. The box body 1 includes a guiding groove 3. The guiding groove 3 extends from the top portion of the box body 1 into an interior of the box body 1. A shielding member 4 is slidably received in the guiding groove 3. The box body 1 of the connection box is inserted into a top face of a desk when in use. The plug-in panel 2 is used for supply power to electronic devices, electrical appliances, etc. The shielding member 4 can cover the plug-in panel 2 to avoid dusts or liquids from falling onto the plug-in panel 2 when not in use while increasing the aesthetics of the top face of the desk.

The guiding groove 3 includes a first section 31 located above the plug-in panel 2, a second section 32 on an end of the plug-in panel 2, and a third section 33 below the plug-in panel 2. The shielding member 4 is slidable along the first section 31, the second section 32, and the third section 33. By providing a guiding groove 3 having three sections in which the first section 31 is located above the plug-in panel 2, the plug-in panel 2 can be covered when the shielding member 4 is in the first section 31. Furthermore, the second section 32 is on an end of the plug-in panel 2, and the third section 33 is below the plug-in panel 2. Thus, the overall guiding groove 3 is substantially slanted U-shaped, such that the shielding member 4 can be suitably received in the box body 1, which is advantageous to reduction in the volume of the box body 1, reduction in the material of the box body 1, and increase in the overall aesthetic of the connection box.

The shielding member 4 is soft. The shielding member 4 is comprised of a plurality of sections connected to each other. Each two adjacent sections are rotatable relative to each other. The shielding member 4 includes a handgrip 42 which can be gripped by a user to easily slide the shielding member 4. Since the guiding groove 3 is substantially slanted U-shaped and the shielding member 4 is soft, the shielding member 4 can slide smoothly in the guiding groove 3. By provision of the shielding member 4 comprised of a plurality of connected sections in which each section can rotate at the interconnecting portion, more smooth sliding movement of the shielding member 4 is provided.

The box body 1 includes a fixing block 5 including at least one coupling board 51 configured to be coupled with at least one opening in a top face of a desk.

The box body 1 further includes a plurality of recessions 11. The fixing block 5 includes a plurality of protrusions 52 engaged with the plurality of recessions 11 to connect the fixing block 5 to the box body 1.

The plug-in panel 2 includes a plurality of plug-in holes 21 and is in electrical connection with a wireless charging module 6.

Although the present invention has been described with respect to the above preferred embodiments, these embodiment are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

The invention claimed is:

1. A connection box comprising a box body and a plug-in panel disposed on a top portion of the box body, wherein the box body includes a guiding groove therein, wherein the guiding groove extends from the top portion of the box body into an interior of the box body, and wherein a shielding member is slidably received in the guiding groove, the shielding member being soft, and the shielding member comprising a plurality of sections connected to each other, wherein each two adjacent sections are rotatable relative to each other.

2. The connection box as claimed in claim 1, wherein the guiding groove includes a first section located above the plug-in panel, a second section on an end of the plug-in panel, and a third section below the plug-in panel, and wherein the shielding member is slidable along the first section, the second section, and the third section.

3. The connection box as claimed in claim 1, wherein the box body includes a fixing block including at least one coupling board configured to be coupled with at least one opening in a top face of a desk.

4. The connection box as claimed in claim 1, wherein the shielding member includes a handgrip.

5. The connection box as claimed in claim 3, wherein the box body further includes a plurality of recessions, and wherein the fixing block includes a plurality of protrusions engaged with the plurality of recessions to connect the fixing block to the box body.

6. The connection box as claimed in claim 1, wherein the plug-in panel includes a plurality of plug-in holes and is in electrical connection with a wireless charging module.

* * * * *